ASSOCIATIVE MEMORY SYSTEM FOR SEQUENTIAL RETRIEVAL OF DATA

Filed Nov. 27, 1963

3 Sheets-Sheet 1

INVENTORS
ROBERT C. BRIGHAM
ROBERT S. SINGLETON

BY Julian C. Renfro
ATTORNEY

INVENTORS
ROBERT C. BRIGHAM
ROBERT S. SINGLETON
BY Julian C. Renfro
ATTORNEY

INVENTORS
ROBERT C. BRIGHAM
ROBERT S. SINGLETON

BY Julian C. Renfro
ATTORNEY

United States Patent Office 3,339,181
Patented Aug. 29, 1967

3,339,181
ASSOCIATIVE MEMORY SYSTEM FOR SEQUENTIAL RETRIEVAL OF DATA

Robert S. Singleton, Orlando, Fla., and Robert C. Brigham, Little Silver, N.J., assignors to Martin-Marietta Corporation, Middle River, Md., a corporation of Maryland
Filed Nov. 27, 1963, Ser. No. 326,590
8 Claims. (Cl. 340—172.5)

This invention relates to systems for information storage and retrieval, and more particularly to digital data storage systems provided with means for systematically and rapidly searching for and retrieving particular prelected data stored within the system.

Magnetic core matrix memories are extensively employed as storage devices in electronic computing machines. It is common in the operation of a computer to store a quantity of data in binary form in the memory by placing some of the cores in one magnetic state and by placing other cores in other distinct magnetic states. The combinations of cores in the various magnetic states are representative of digital data which is recognizable by the computer.

In a typical memory using binary storage elements the cores in a matrix are composed of an alloy having a substantially rectangular hysteresis loop, each core being capable of retaining either of two opposite magnetic remanence states indefinitely unless switched to the other by a current along the wires passing through the matrix. The opposite remanence states conventionally employed for representing digital information are arbitrarily designated as 0 and 1.

Selective passage of current through the core driver wires switches the desired pattern of cores to a selected state, where each core in the pattern has either the value 0 or the value 1. One way this switching may be accomplished is by the coincidence of current along two wires intersecting at the selected core, each wire carrying half-select current, i.e., half of the current necessary to induce magnetism sufficient to switch the core between states. Once the cores of the memory matrix are loaded with data, the data remains until destroyed or replaced.

The retrieval of information from a memory matrix may be accomplished in either a coordinate-address mode or a content-address mode. In the coordinate-address mode a particular word is selected by specifying its address or location within the memory matrix. Many conventional computer memories operate in this mode. Content-address mode memories, on the other hand, select a particular word on the basis of information stored within the word itself. In such a memories, a search criterion is established and all words are compared with a common reference in order to determine which ones satisfy the criterion. Those which do satisfy the criterion are identified. Content-address mode memories are often called search or associative memories.

Search and comparison operations, when carried out by a standard nonassociate memory system, have required exceedingly long search periods due to the fact that searches through the separate parts of the memory are necessarily carried out in sequential fashion, word by word and bit by bit. On the other hand, associative memories have indeed been employed which could be searched rapidly by the simultaneous comparison of a plurality of words in the memory. However, the scope of the search which has been possible heretofore in associative memory systems has not been broad, and the search criteria employed in programmed searches have been limited. For example, searches involving any type operation other than quality comparison of a test or master word with the words in the memory have been possible only on a very limited basis or else at great expense. In addition, the reading from associative memory systems of multiple associations, once they have been searched and detected, has not been accomplished with freedom from ambiguity without an extensive and time-consuming analysis of the results of the search.

Practical search memories must incorporate logic not only to detect when a word satisfies the selected search criteria, but also to identify those words which do satisfy the criteria, and to resolve the potential ambiguity which arises when more than one word is so identified. It is therefore an object of this invention to provide a digital data storage and retrieval system with a rapid and versatile capability to search all words in memory simultaneously and to provide fast and unambiguous sequential access to only those words identified as meeting the search criteria.

A further object of the invention is to provide means for the rapid search of a memory matrix and a comparison of the words in such matrix with a number of selected search criteria including (1) equality with a given master or reference word, (2) greater than or equal to the reference word, (3) less than or equal to the reference word, and (4) between limits established by a lower limit reference and an upper limit reference.

In the practice of this invention, the search operation in an associative memory system is conducted independently of the read operation. The search command, which interrogates all words in memory simultaneously, places no information in the output register, but instead conditions a logic system to respond uniquely and rapidly to a read command executed subsequent to the search command. When the read command is executed, the preconditioned logic system automatically ignores all words in memory which have not met the search criteria and propagates the read command through high-speed gate circuitry directly to select the first word in memory which has met the search criteria. At this point, the read command is terminated so that it will not continue through the logic system and read out any other words in memory which have met the search criteria. Before the termination of the read command, however, the associated memory word is read into an output register and the logic system is set so that the next read command thereafter ignores not only those words which have not met the search criteria, but also those words which have met the search criteria and have been read out of memory. Thus, each read command selects one and only one memory word, and successive read commands select different words. If no memory words have met the search criteria, or if all words which have met the search criteria have been read previously, the read command records this fact so that subsequent reading will be terminated.

Although the scope of this invention is not to be limited except by the appended claims, further details of the invention as well as additional objects and advantages will be better understood in connection with the following description taken together with the accompanying drawings which disclose, by way of example, the principles of the invention and the best mode which has been contemplated of applying those principles.

Figure 1:
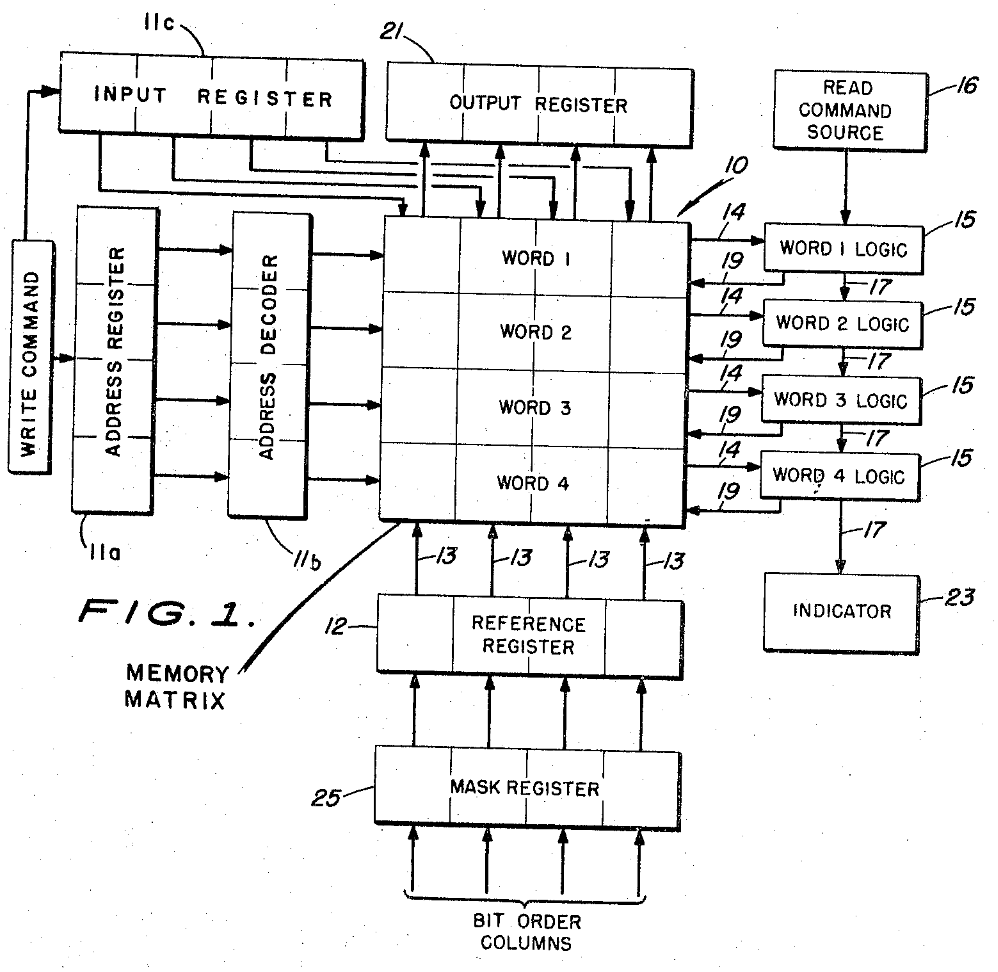
FIGURE 1 is a block diagram of an associative memory system embodying the invention.

Reference is now made to the associative memory system of FIGURE 1, to illustrate in general the manner in which the operations WRITE, SEARCH and READ are carried out in the practice of this invention. At the heart of the memory system shown in this figure is a memory matrix 10 capable of storing digital data in an ordered array and of delivering up portions of the stored data upon command. The memory matrix 10 contains discrete bit storage elements arranged in this illustrative example in four horizontal word rows and in four vertical bit order columns intersecting all word rows. In the use of the memory matrix the first step is to store within it the digital data to be processed. In accordance with well known techniques, this is accomplished by a WRITE command processed through an address register 11*a* an address decoder 11*b*, and an input register 11*c* to store information in the matrix.

Reference register 12 is employed in the search operation during which the data stored within the memory matrix 10 is searched for correspondence with a master word. Hence, a master word is first recorded in the reference register 12 and each of the words in memory is compared with the master word. Upon command, a SEARCH pulse is sent via bit lines 13 simultaneously through one or more bit order columns in all words. In traversing each of the word rows, the SEARCH pulses do not read any information out of memory. Instead they cause a mismatch pulse to be generated from each bit storage element which does not match the corresponding order bit in the master word. These mismatch pulses are sent simultaneously along word lines 14 to the associated word logic unit 15. The word logic units 15 are capable of assuming either of two opposite states in response to the input information in the form of mismatch signals which they receive from their respective word lines. On the basis of preselected criteria established within the logic units themselves, the mismatch signals are analysed and one internal condition termed the RESPOND state is established in each logic element if its associated memory word satisfies the criteria and a complementary internal condition termed the IGNORE state is established if the criteria are not satisfied. It should be noted that in response to signals applied over word lines 14 these logic elements 15 operate in parallel, not in sequence, and that all words in the memory matrix are capable of being searched and analysed simultaneously.

Regardless of the fact that the SEARCH command initiates a search and that the results of the search undergo analysis by the logic elements 15, no information is read out of the memory matrix 10 in response to the search command. Readout is accomplished by a subsequent READ COMMAND pulse generated by source 16. This READ COMMAND pulse is applied to the WORD 1 logic element and then in sequence to each of the succeeding logic elements. The state which has been established in each logic unit will determine the response made to the READ COMMAND pulse.

If, for example, the mismatch pulses applied to the WORD 1 logic unit have not met the criteria established within that element, the latter assumes the IGNORE state in which it ignores the READ COMMAND pulse and routes it immediately over READ COMMAND line 17 to the WORD 2 logic unit. If, on the other hand, the results of the search through WORD 2 in memory have satisfied the criteria established in the associated WORD 2 logic unit, the response is different. Upon receiving the READ COMMAND pulse over line 17 the WORD 2 logic unit generates a READ CURRENT which is sent over line 19 to the WORD 2 row in the memory matrix to cause the memory WORD 2 to deliver up its information to the output register 21. In performing this operation, the WORD 2 logic unit does not propagate the READ COMMAND pulse on to the WORD 3 logic unit. However, having responded to the READ COMMAND pulse, the WORD 2 logic unit then switches to the IGNORE state in which it does not respond to subsequent READ COMMANDS but passes them instead over the READ COMMAND line 17 to the WORD 3 logic unit.

It can be seen therefore, that the READ COMMAND pulse is routed directly to the first word in memory satisfying the search criteria and causes this word to be read into the output register common to all words in memory. From the output register the information can be processed by conventional techniques. The second READ COMMAND pulse is similarly routed directly to the second word which satisfies the search criteria. This process is repeated until all words fulfilling the search criteria have been found and have been read into the output register. When no more words are left to be read into the output register, the last READ COMMAND pulse passes through all word logic units to indicator 23. One form which indicator 23 may take may be that of a flip-flop unit which assumes a SET state upon receipt of a READ COMMAND pulse indicative of the fact that the SEARCH and READ operations have been completed.

It can thus be seen that while the search operation is performed through all words in parallel, the READ operation is performed sequentially, through high speed routing logic. It should also be noted that in response to a READ COMMAND one and only one word satisfying the search criteria is read into the output register. Furthermore, those words which do not satisfy the search criteria do not delay the READ operation significantly since the logic units associated with those words pass the READ COMMAND pulse immediately down the READ COMMAND line until either a word is found which satisfies the search criteria or the end of the READ operation is signalled. In summary, then, logic units associated with each memory word have both a parallel and a serial operating capability. These units operate in parallel during a search when all word output lines are analysed simultaneously, and in series after a search when successive READ COMMAND pulses sequentially select only those words which have satisfied the search criteria.

In general, the READ COMMAND will be a part of a program loop which includes instructions which process the information extracted by the READ COMMAND. The setting of the indicator 23 therefore marks the time when exit should be made from this program loop. This may be accomplished quite easily by incorporating the decision into the definition of the READ COMMAND itself. The command is then interpreted as a conditional transfer instruction. If the READ COMMAND instruction detects a word which satisfies the search criteria and extracts this word from the memory, that is if the indicator 23 remains reset, then the instruction is followed by the next instruction in sequence. If, however, the READ COMMAND instruction results in no match word being extracted from the memory and instead sets the indicator 23, the next instruction is taken from the address given in the READ instruction word.

In addition to the reference register 12 shown in FIGURE 1 a mask register 25 is provided. In search operations, the reference register 12 may contain any arbitrary number and it is not necessary to search all bit positions of all words. A bit position is not included in the search simply by not pulsing a particular bit order column. In use only those bits in the reference register 12 which are selected by the mask register 25 are actually compared.

Figure 2:
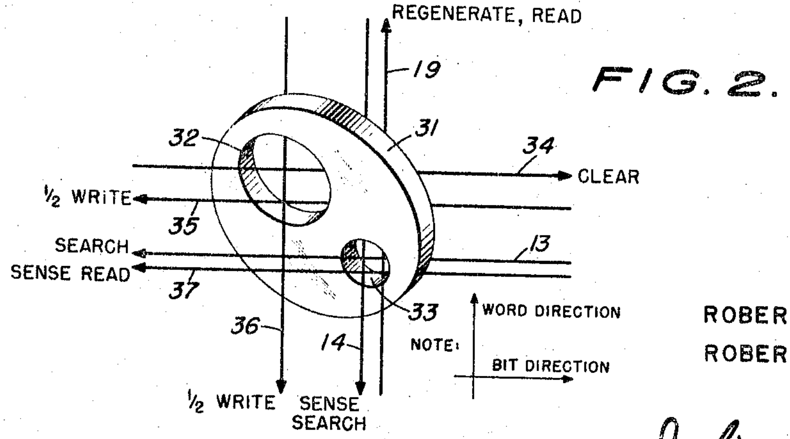
FIGURE 2 is a pictorial illustration of a magnetic core with associated windings of a type suitable for use in the memory matrix of FIGURE 1.

Reference is now made to FIGURE 2 which shows a magnetic core of the multi-aperture type suitable for use as bit storage elements in the memory matrix of FIG- URE 1. The core 31, which should be of ferrite, has a major aperture 32 and a minor aperture 33, the major aperture being larger than the minor one. The inductively associated current carrying lines shown passing through the major aperture of the core control the CLEAR and WRITE functions while those passing through the minor aperture supply sense information. To clear the core, that is, to WRITE 0, is accomplished by a full select current pulsed through line 34 associated with the major aperture. To WRITE 1 is effected by the coincidence of half select currents pulsed through bit line 35 and word line 36, both associated with the major aperture.

During SEARCH a full select current is pulsed through line 13 associated with the minor aperture and the state of the core is sensed by an induced current on line 14. During the READ phase, the READ current is injected through the minor apertures by line 19 and the state of the core is sensed by line 37.

Figure 3:
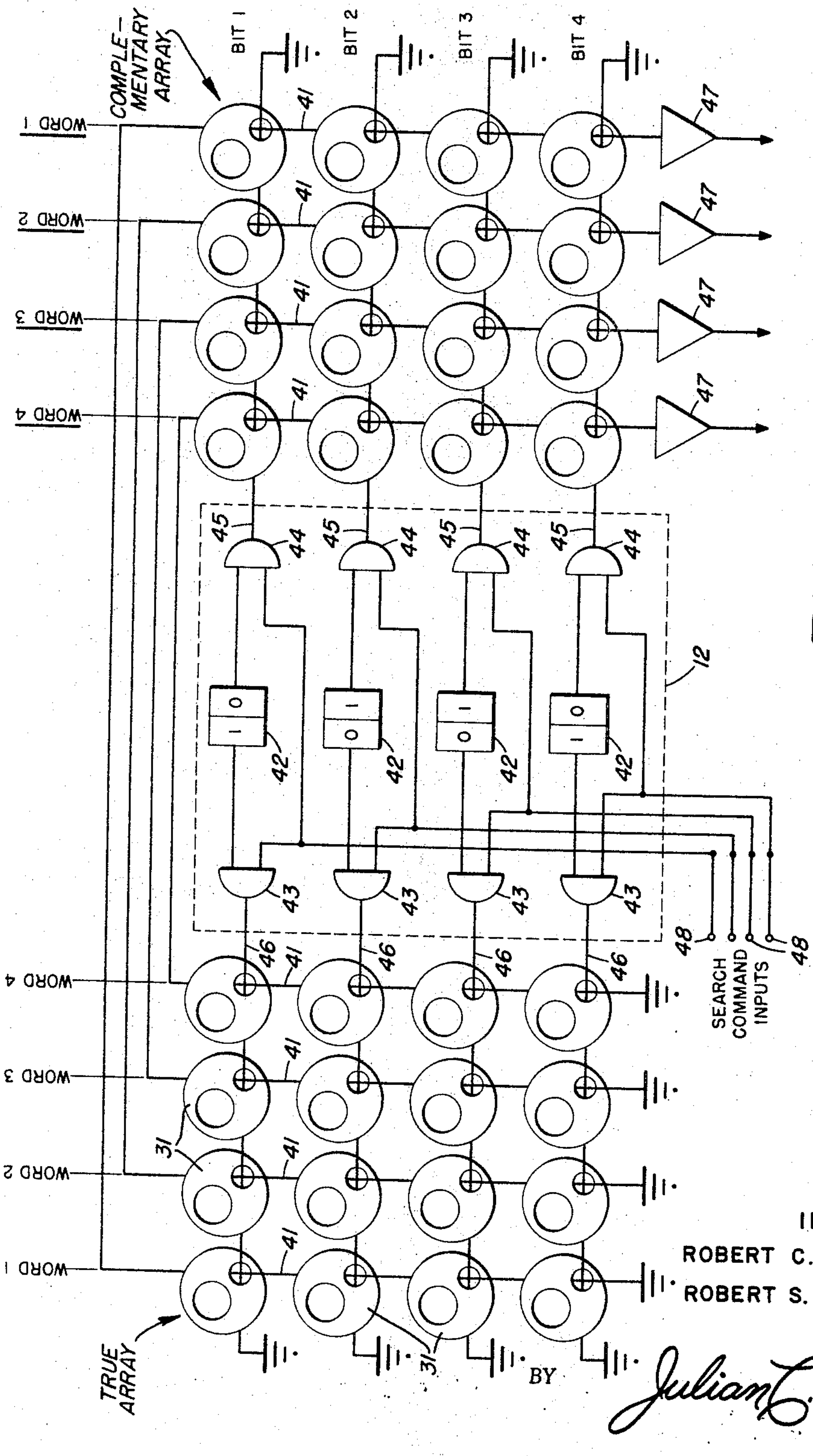
FIGURE 3 is a partially schematic and partially pictorial illustration of the reference register and the memory matrix of FIGURE 1 to show the manner in which a search operation is carried out.

FIGURE 3 shows in more detail the memory matrix of FIGURE 1 incorporating magnetic bit storage elements 31 of the type shown in FIGURE 2 and, associated with the memory matrix, the reference register 12. Since this illustration is intended to demonstrate primarily the nature in which the search operation is carried out, those elements and inductively associated conductive lines for performing the WRITE, CLEAR and READ functions have been omitted for the sake of clarity. The memory matrix illustrated here contains bit storage elements arrayed in vertical word rows and horizontal columns, with two complementary portions forming a double array in which the words stored in the left-hand array have corresponding ones complements stored in the right-hand array. Consequently, each bit in each word has two magnetic cores associated with it. When a 1 is recorded in a word bit in the left-hand portion of the array, a complementary 0 is recorded in the corresponding word bit in the right portion of the array, and vice versa. A word line 41 is associated with each word and threads the minor apertures of all cores of the word. In conducting a search the reference register 12 compares the corresponding bits of each word in memory with a master word stored in the reference register.

In each bit position of reference register 12 there is included a flip-flop 42, and a pair of AND units 43 and 44 respectively. The master word is recorded in the reference register by setting the flip-flops 42 to indicate the identity of the master word. For example, if the bit 1 flip-flop 42 is set to contain a master word bit of 0, upon the initiation of a SEARCH command the associated AND unit 43 will cause an interrogation pulse to be sent through the left-hand or true array of the memory matrix along bit line 46 to test all of the bit 1 positions in words 1 through 4. The other AND unit 44 associated with the bit 1 position will receive no signal from its associated flip-flop 42 and will therefore not send an interrogation pulse through line 45 in the right-hand or complementary portion of the memory matrix in response to a SEARCH command. The situation is reversed if the flip-flop 42 is set to register a 1 as represented in the second bit order position. Under such circumstances the bit 2 AND unit 43 will not respond to the SEARCH command, but its associated AND unit 44 will deliver an interrogation pulse through line 45 to the right-hand or complementary half of the memory matrix.

The interrogation pulses delivered by AND units 43 and 44 test the corresponding bit positions of all words in memory simultaneously for match or mismatch with the corresponding order bit of the master word. Any mismatch of a true memory word with the reference register master word causes a signal to be generated on one of the word lines 41 to indicate the result of the comparison. All bits of a particular memory word are traversed by one of these word lines 41, which terminate in respective output amplifiers 47 for signalling equality or inequality of the memory word with the master word.

The search operation is triggered by a SEARCH command pulse applied to the alternate inputs of the AND units. If the SEARCH command is applied instantaneously to all AND units, the result is a simultaneous comparison of all bits of the master word stored in the reference register in a parallel-by-bit, parallel-by-word search. However, because of the low signal-to-noise ratios inherent in the use of ferrite cores, a serial-by-bit parallel-by-word search is preferable. In this latter type of search the most significant bit of every word in memory is compared with the most significant bit of the master word; the next most significant bit of every word in memory is then compared with the corresponding bit in the master word, and so on through as many comparisons as are necessary in the search. To perform a serial-by-bit, parallel-by-word search a series of SEARCH command pulses are applied in sequence through terminals 48 to the respective AND units of each bit order column.

Figure 4:
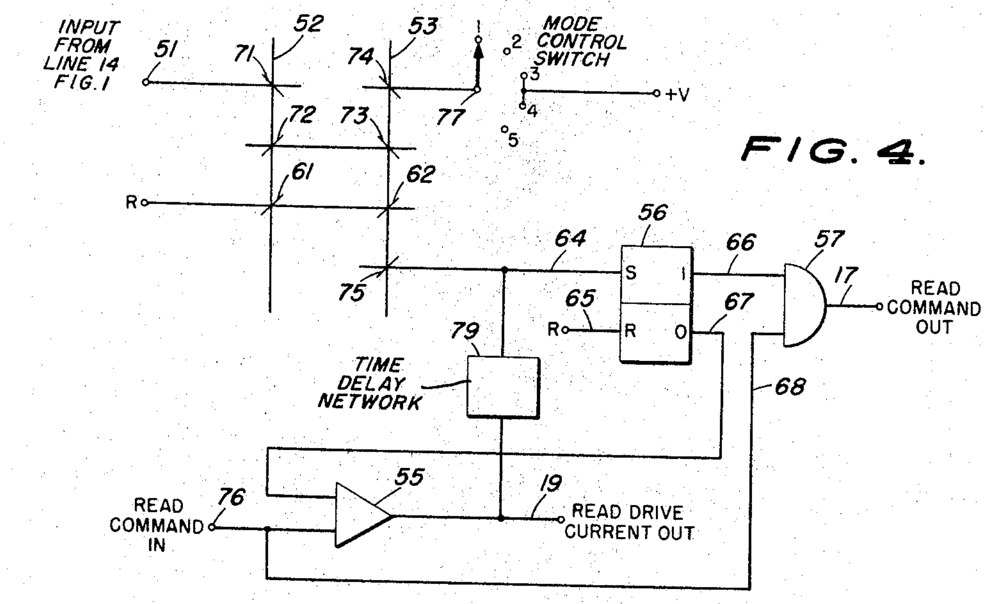
FIGURE 4 is a schematic diagram of the preferred form of the logic element employed in the system of FIGURE 1.

In the preferred embodiment of this invention the logic unit associated with each word of the memory matrix 10 is of the type shown in FIGURE 4. Each such logic unit is connected to receive through terminal 51 the mismatch signals produced on its associated word line. The logic unit incorporates two ferrite cores 52 and 53, respectively, each with a plurality of electrical windings thereon for sense and control purposes. The magnetic cores are here represented in conventional fashion by heavy vertical line segments, winding leads by horizontal lines, and the electrical windings themselves by 45-degree "mirror" symbols at the intersections of the cores and the winding leads. The polarities of the several windings are indicated by their angularities, whether upward to the right or downward to the right. The sense of the magnetic flux induced by a current in any selected winding may be determined by considering the incoming current to that winding as if it were reflected along the core in the direction indicated by the angularity of the "mirror" symbol. The direction of the induced currents on the other hand may be found in accordance with Lenz's law; that is, induced currents will be in such a direction as to support the magnetic field existing before the applied current. Induced currents will therefore reflect flux in their respective "mirrors" in a direction opposite to that induced by the applied current.

The logic unit shown in FIGURE 4 also incorporates as a part thereof a gated current amplifier or driver 55, a flip-flop 56, and a high speed AND gate 57. Magnetic cores 52 and 53 are linked by reset windings 61 and 62 respectively and the flip-flop 56 is provided with a set connection 64 and a reset connection 65. At the beginning of each search operation a reset pulse is applied to windings 61 and 62 and to reset connection 65. This establishes the flux upward in cores 52 and 53. It also resets the flip-flop 56 to provide an 0 signal on output lead 66 to the AND gate and a 1 signal on output lead 67. The condition of the logic unit is then such that cores 52 and 53 are saturated in a flux upward state, and the AND gate 57 is rendered nonconductive to any signals applied to its input read command line 68 by virtue of the 0 signal which it receives over line 66 from the flip-flop 56. Simultaneously, the 1 signal applied from the flip-flop 56 over line 67 functions as an enabling signal to permit current driver 55 to be responsive to a READ COMMAND signal impressed upon terminal 76. The condition described above will be referred to hereinafter as the RESPOND state for reasons which will become apparent.

After the logic unit has been reset in the RESPOND condition, the search operation is initiated through the associative memory as previously described in connection with FIGURE 3. It is to be recalled that when a SEARCH command is initiated through the memory matrix, an output pulse will appear on each of the word lines in which a mismatch of the memory word with the master word has been detected. A current pulse applied at terminal 51 in FIGURE 4 therefore indicates that a mismatch conditions has been found. This current pulse alters the condition of the logic unit and may place it in a different state of receptivity. The mismatch pulse applied to winding 71 of core 52 will switch the flux in that core from the RESET state to the SET state with the flux downward. As core 52 switches it will induce a current from its winding 72 into winding 73 of core 53 tending to set core 53 with its flux also downward. Actually, the bias applied to the search criteria winding 74 will determine whether core 53 sets in response to one or more mismatch pulses, but for purposes of the present discussion it can be assumed that no bias is applied to this winding and that one mismatch pulse is sufficient to set core 53. As shown in FIGURE 4, the bias or mode control switch 77 connected to winding 74 is in an open zero-bias position so that winding 74 has no effect upon the switching of core 53. The switching of core 53 generates an input signal through winding 75 and line 64 to the flip-flop 56 causing the latter to switch from one bistable condition to another, thereby removing the enabling signal from line 67 to current driver 55 and applying an enabling 1 signal on output lead 66 to the AND gate 57.

In summary, if during the search operation a MATCH condition is found no signal will appear at input terminal 51 and the logic unit will remain in the RESPOND state to which it had been reset with cores 52 and 53 reset, the flip-flop 56 reset, the AND gate disabled, and current driver 55 enabled. If, however, at least one mismatch is found during the search operation the pulse applied through terminal 51 will place the logic unit in the IGNORE state in which cores 52 and 53 are set, the flip-flop 56 is set, the AND gate 57 is enabled and current driver 55 is disabled. One of these two conditions will exist when the READ COMMAND pulse is applied subsequently to the read command input line 76.

When a READ COMMAND pulse is applied to the logic unit, one of two events will occur. If one or more mismatches have been detected during the search and the search criteria have not been met, the logic unit will ignore the READ COMMAND pulse and pass it at a nearly instantaneous propagation speed through high-speed gate 57 to the read command output line 17. If, on the other hand, a matched condition has been detected in the memory search, the READ COMMAND pulse is not ignored by the logic unit. Instead its further propagation is blocked by AND gate 57 and a READ CURRENT is generated on line 19. The READ CURRENT thus generated is employed to read out of the associative memory matrix only that word which during the previous search has been determined to meet the search criteria.

The reason the logic unit responds in this manner to read command signals is as follows: if a mismatch has been found during the search the READ COMMAND pulse applied to terminal 76 (1) fails to produce an output from current driver 55 because the 0 signal on line 67 prevents it from responding, and (2) passes rapidly through the high speed AND gate 57 to the READ COMMAND output line 17. As has been pointed out, the READ COMMAND output line of one logic unit is connected directly to the READ COMMAND input line of the next adjacent logic unit.

When, on the other hand, a matched conditions has been discovered during the search of the memory matrix, no signal is applied to terminal 51 to alter the initial reset state of the logic unit. Therefore, when the READ COMMAND pulse is applied at 76, the gated current driver 55, conditioned by the 1 signal on line 67, generates a responsive READ CURRENT pulse over line 19. Line 19 corresponds to the output conductor of the same number in FIGURE 1. Hence a READ CURRENT on this line directs the associated word in the memory matrix to be read into the waiting output register.

The READ CURRENT pulse on line 19 also produces an internal effect upon the state of the logic unit to cause it to shift from the RESPOND state to he IGNORE state. For this purpose a portion of the READ CURRENT is applied through a time delay network 79 to the set connection 64 of the flip-flop 56. This causes the flip-flop 56 to switch from the RESET state to the SET state after a predetermined time interval. The delay period introduced by network 79 is selected to be sufficiently long to permit the READ CURRENT signal to complete the READ operation and to permit the READ COMMAND pulse to terminate so that it will not propagate through the AND gate 57 to the next stage of the logic system. After the delay period has passed, it can be seen the logic unit is left in a state which is logically identical, as far as READ COMMAND signals are concerned, to the IGNORE state achieved by a mismatched condition. Hence, the next READ COMMAND pulse will be ignored by the logic unit and will be propagated not only by that logic unit but through all succeeding logic units until it terminates ultimately in a logic unit which is in the RESPOND state or until it signals the conclusion of the READ operation. All words meeting the search criterial can thus be read out of the memory matrix by a series of READ COMMAND pulses.

*Equality search*

In the description of the associative memory system thus far, the search and readout functions have been analyzed for data retrieval operations aimed only at searching and reading out of memory those words corresponding exactly with the master word in the reference register. That is to say, the search criterion discussed to this point has been EQUALITY with the master word, although, as has been pointed out, only those bits selected by the mask register need actually be compared. In an EQUALITY search a single mismatch between the master word and the memory word is sufficient to set the associated logic unit to its IGNORE state. The associative memory system described herein is, however, capable of a variety of search operations employing different search criteria. Other search criteria which may be employed are: LESS THAN OR EQUAL, GREATER THAN OR EQUAL, BETWEEN LIMITS, LESS THAN, and GREATER THAN. It should be kept in mind that at the beginning of a search employing any of these criteria, the bistable elements in the logic units are reset to place the logic units in the RESPOND state. This is the state which indicates that the associated word in memory has met the search criterion. During the search, the separate logic units are set to the IGNORE state when the search criterion is found not to be met. Those words remaining in the reset or RESPOND state at the end of the search must therefore have satisfied the search criterion.

*Less than or equal search*

Any number in the reference register may be compared with all memory words in order to determine those words in memory which are less than or equal to the master word. Starting with the most significant end of the master word, a serial-by-bit comparison is made. If a memory word bit and the corresponding master bit word are identical, no decision can or need be made by the associated logic unit. However, a decision can and must be made when the first mismatch pulse is generated over one of the word lines. The mismatch pulse indicates that the corresponding memory word and the master word are different in at least one respect. If a mismatch occurs, and the reference bit under comparison in the master word is 0, the corresponding memory bit must be 1 and hence the memory word is larger. Such a memory word does not meet the search criterion of a LESS THAN OR EQUAL search and this situation must cause the detection logic to be set to the IGNORE state. If, however, a mismatch occurs and the reference bit in the master word is 1, the corresponding bit in the memory bit must be 0 and hence the memory word is smaller. In a LESS THAN OR EQUAL search, this type of mismatch must not result in the logic unit switching to the IGNORE state.

Referring again to FIGURE 4, it may be seen that the first mismatch pulse applied through terminal 51 causes the core 52 to be set. Further mismatches with the same word also attempt to set core 52. Any such further mismatches are, however, ignored because 52 is already switched to its set state with flux downward. Core 52 therefore acts as a mismatch detector which disables the word logic unit after the first mismatch has occurred. In switching to the set condition core 52 also attempts to switch core 53. The effect of the switching of core 52 upon core 53 may be controlled by supplying a bias potential to bias winding 74 through bias switch 77.

It is worth digressing at this point to make it clear that switch 77 as well as other switches illustrated and referred to hereinafter are presented symbolically. In the usual case these switches will not be mechanical in nature but electronic. For example, they may take the form of transistor circuits operating in a switching mode and controlled by a trigger pulse. Other forms of switching circuits are also possible, such as so-called magnetic amplifiers. Wherever a switch appears in any of the illustrated circuits, therefore, it should be understood to be representative of a broad class of functional elements capable of performing a switching operation.

Whether bias switch 77 is set to apply a bias potential to winding 74, depends upon the nature of the search operation being performed and upon whether the particular bit under comparison in the master word is 1 or 0. In programming the search operation, the nature of the interrogation pulse sent over a bit line into the memory matrix is made to control the condition of the bias switch. In a LESS THAN OR EQUAL search, the switch is set at position 4 to apply a flux upward or reset bias to core 53 when the reference bit under comparison in the master word is 1, and at position 5 to apply no bias when the reference bit under comparison in the master word is 0. Assume first that the latter is true and that bias switch 77 is in position 5. Winding 74 of core 53 is thereby open and core 53 will be switched to a set position by the switching of the core 52. In turn, the flip-flop 56 will switch, enabling the AND gate 57 and disabling the gated current driver 55. This is the IGNORE state of the logic unit which is achieved when the word fails to satisfy the search criterion.

Consider now that a mismatch occurs and the reference bit undergoing comparison is 1, indicating that the memory word is smaller. Since the reference bit in the master word is 1, the switch 77 is placed in position 4 to supply a bias current to the winding 74 thereby to inhibit the switching of core 53 from its reset condition. In the event, therefore, that core 52 is switched due to a mismatch signal, the switching of core 53 is prevented and the logic unit remains in the reset or RESPOND state.

The LESS THAN OR EQUAL search therefore leaves each word detection logic unit in one of its two permissible states. The logic units will thus respond to the same READ COMMAND pulses given during an EQUALITY search. In this case, however, succesive READ COMMAND pulses place in the output register these memory words which are LESS THAN OR EQUAL to the master word in the reference register.

*Greater than or equal search*

A GREATER THAN OR EQUAL search is identical to a LESS THAN OR EQUAL search except that core 53 is inhibited from switching only if the comparison bit in the master word is a 0. Thus a word logic unit is set to the IGNORE state only if the correspoding memory word is smaller than the master word. Therefore, successive READ COMMAND pulses place in the output register those memory words which are GREATER THAN OR EQUAL to the master word in the reference register.

*Between limits search*

All memory words lying in the closed interval defined by a lower limit and an upper limit may be determined and read out of memory by a BETWEEN LIMITS search. This is really a combination of two simpler searches. First, a GREATER THAN OR EQUAL search on the lower limit is effected causing all words which are smaller than the lower limit to set their associated word detection logic unit to the IGNORE state. Following this operation, a LESS THAN OR EQUAL search is conducted through memory on the basis of an upper limit which sets to the IGNORE state those word logic units associated with words larger than the upper limit. Those logic units which remain reset after both searches are completed correspond to words which are greater than or equal to the lower limit and less than or equal to the upper limit. It is these words, therefore, which successive READ COMMAND pulses place in the output register to complete the readout of all memory words lying between the preselected limits.

Figure 5:
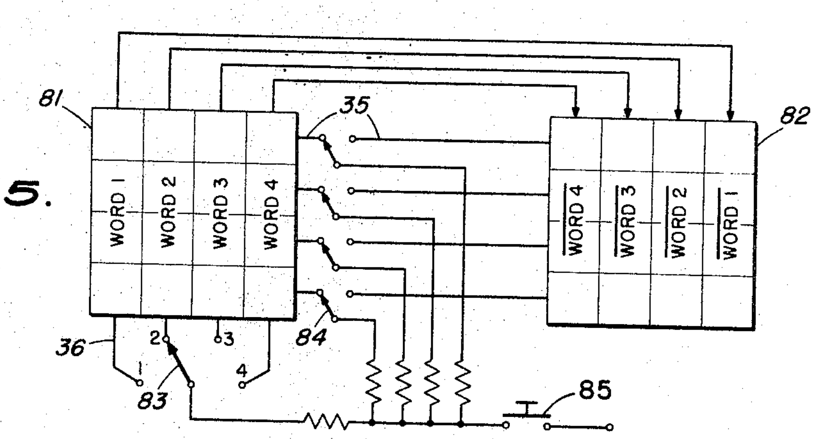
FIGURE 5 is a partially schematic diagram of the memory matrix shown in FIGURE 3 illustrating the manner in which digital data is stored in memory.

In connection with FIGURE 5 may be seen the manner in which information is stored in the memory matrix by creating one or the other of opposite magnetic states in the magnetic bit storage elements which make up the memory matrix. In this figure, the true array 81 on the left and the complementary array 82 on the right represent in simplified form the left and right-hand arrays of bit storage elements shown in FIGURE 3. The lines 35 and 36 in FIGURE 5, which correspond to those lines of the same number illustrated in FIGURE 2, pass through the major apertures of all magnetic cores in the memory matrix. To WRITE data into the memory matrix the selector switch 83 is set to a particular word row and the separate switches 84 representing an input register are set to positions indicative of the word to be stored in the memory matrix. Those switches set to the left represent the 1 bits of data; those set to the right represent 0 bits. Upon application of a magnetizing WRITE current as symbolized by the closing of pushbutton switch 85, a half-select current flows through conductors 36 in the word row and half-select currents flow through the bit column conductors 35 either into the left-hand half of the memory matrix or into the right-hand half. The coincidence of these half-select currents through particular magnetic bit storage elements in the memory matrix serves to write the preselected word into the memory. This process is repeated, of course, through each word of memory.

Figure 6:
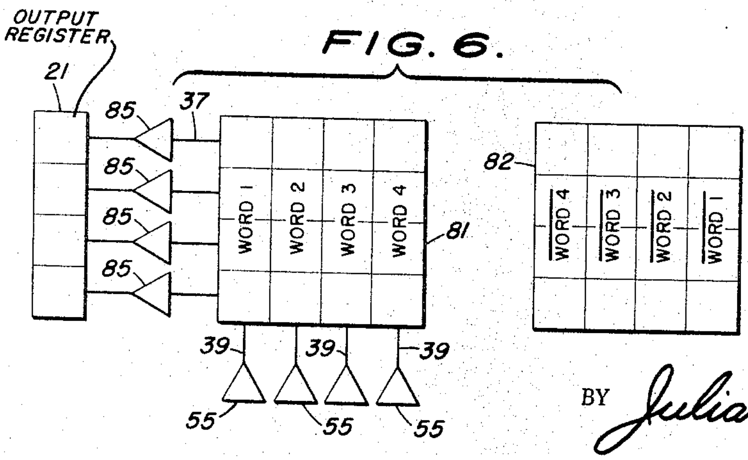
FIGURE 6 is a partially schematic diagram of the memory matrix shown in FIGURE 3 illustrating the manner in which information is read out of memory.

In FIGURE 6 are illustrated the connections to the memory matrix for the readout operation. In this figure the arrays 81 on the left and 82 on the right represent the same portions of the memory matrix identified by the same numbers in FIGURE 5. However, the bit column lines 37 and the word row lines 19 illustrated in this figure thread the minor apertures of the bit storage elements rather than the major apertures. Lines 37 and 19 correspond again to those lines of the same number as illustrated in FIGURE 2.

It is to be noted that the right-hand or complementary portion 82 of the matrix is not required to participate in this operation, since only the true portion 81 on the left need be active. Current drivers 55 in each of the word logic units, activated as previously described, generate READ CURRENTS over minor aperture lines 19 threading the word rows. The magnetic states of the cores in any selected word row are sensed by currents on lines 37 of the respective bit order columns, which currents are amplified by sense amplifiers 85 to create a display or other record of the word information in output register 21.

It is to be understood that many variations obvious to those skilled in the art may be effected in associative memory systems constructed in accordance with this invention, not only in the details of the construction, but also in the manner of use. For example, it is obviously possible to alter the word length or the number of words in the search memory. Changing the word length simply changes the time required for each search if, of course, the search is conducted on a serial-by-bit basis. Changing the number of words in memory also alters the number of word detection logic units required and the maximum propagation time of the READ COMMAND pulse through the series of word logic units. Although a READ COMMAND pulse can propagate through a word logic unit which is in the set or IGNORE state in a few nanoseconds, it is possible that the total amount of time for such pulses to propagate through the logic system might be burdensome if the memory matrix contains a very large number of words. It is possible, however, to incorporate a control system to by-pass one or more selected groups of word logic units after the READ COMMAND pulse has once passed through each logic unit in the group. Such a control system is simply implemented in conducting data retrieval operations. It is further possible to alter not only the portion of the memory word which is searched but also the portion of each memory word which is read into the output register. The portion of the master word searched and the portion of the memory word which is read out may be completely separated.

An EXACT GREATER THAN search may be performed by adding 1 to the least significant end of the reference register and then performing the normal GREATER THAN OR EQUAL search. Similarly, an EXACT LESS THAN search may be performed by subtracting 1 from the least significant end of the reference register before a normal LESS THAN OR EQUAL search is conducted. A search between open limits may be executed by adding 1 to the least significant end of the lower limit and by subtracting 1 from the least significant end of the upper limit prior to a normal BETWEEN LIMITS search. Finally, when the mask register indicates that a position is to be ignored during an equality search, it is possible to reduce the time required for the search by searching in immediate sequency only those bit positions which are to be compared. These and other such variations as fall within the true spirit and scope of the invention in its broaded aspects are intended to be covered by the appended claims.

What we claim as new and desire to secure by Letters Patent of the United States is:

1. A sequential access logic system comprising a source of sequential command signals and a series of logic units, each including: a command signal input and a condition signal input, first and second outputs, the second output in each logic unit being connected to the command signal input of the next succeeding logic unit, means for establishing a RESPOND state in each logic unit wherein said unit generates a control current through said first output in response to a command signal received by said unit, means responsive to condition signals received by each logic unit for switching such unit to an IGNORE state in which such unit propagates command signals received thereby to its second output, means for switching each respective logic unit from its RESPOND state to its IGNORE state after the generation of a control current through said first output, and means for selectively inhibiting the switching of said logic unit from its RESPOND state to its IGNORE state, whereby a command signal applied to said series of logic units is routed in sequence through each logic unit in the IGNORE state to the first logic unit in the RESPOND state and each succeeding command signal is routed sequentially to successive logic units in the RESPOND state for the generation of control currents thereby.

2. An associative memory system for storing and retrieving digital data according to selected criteria comprising:

a magnetic core matrix memory made up of bit colums and word rows of bit storage elements, each of which exhibits plural states of magnetic stability;

means to set said rows of bit storage elements to magnetic states representing respective words of data;

a reference register having a plurality of stages for accepting respective bits of a master word, each stage associated with a column of bit storage elements;

means for generating interrogation signals in accordance with data in the various positions of the reference register along associated columns of bit storage elements;

means including a plurality of word sense lines each traversing the bit storage elements for a particular word row responsive to said interrogation signals for generating mismatch signal on the associated word sense line for each bit storage element containing a mismatch with the related reference register stage;

a plurality of word logic units associated with respectively separate word rows, each of said units including a read command input line, a read command output line, a word line input connected to the associated word sense line, a read current output line, means for establishing within each of said units a RESPOND state in which a read command input signal on said read command input line generates a read current signal on said read current output line, and means responsive to mismatch signals received on said input word line for establishing within said unit an IGNORE state in which a read command input signal on said read command input line is propagated through said unit to its read command output line;

means for selectively inhibiting said word logic units from being placed in the aforesaid IGNORE state in accordance with predetermined criteria;

means connecting the read command output line of each word logic unit to the read command input line of the next succeeding word logic unit, whereby a read command signal applied to said series of word logic units is routed in sequence through each word logic unit in the IGNORE state to the first word logic unit in the RESPOND state; and means responsive to a read current on the read current output line of any of said logic units for reading out of said memory matrix the word of data recorded in the word row associated with the respective logic unit.

3. In an associative memory system comprising an array of word rows for comparing a number of memory words simultaneously with a reference or master word and for generating mismatch pulses along respective word rows indicative of the lack of correspondence between said memory words and said master word, a logic system for controlling the readout from said memory system of those memory words meeting preselected search criteria comprising;

means for selectively generating a series of read command pulses, a series of logic units, each associated with a respective one of said word rows to receive mismatch pulses therefrom in parallel, means connecting said logic units serially to receive read command signals, means in each of said logic units for responding to a read command signal to block the further propagation of said read command signal therethrough and to generate a read current along the associated word row of said memory system for reading out of memory the memory word recorded therein, means in each of said logic units conditioned by said mismatch pulses in accordance with preselected criteria for ignoring a read current signal and for propagating it through to the next successive logic unit, means for selectively inhibiting said logic units from being conditioned by said mismatch pulses in accordance with preselected criteria, and means in each of said logic units conditioned by the generation of a read current signal thereby to cause such unit to ignore succeeding read command signals and propagate them through to succeeding units.

4. An associative memory system for storing and retrieving digital data according to selected criteria comprising:

a memory matrix made up of bit columns and word rows of magnetic bit storage elements each of which exhibits plural states of magnetic stability;
means to set said rows of bit storage elements to states representing respective words of data;
a reference register having a plurality of stages for accepting respective bits of a master word, each stage associated with a column of bit storage elements;
means for generating interrogation pulses in accordance with data in the various positions of the reference register along the associated columns of bit storage elements;
means responsive to said interrogation pulses for generating mismatch pulses along word rows containing a mismatch with said master word;
inductive means for introducing read current signals along said word rows;
means responsive to said read current signals for reading out of said memory matrix the word of data recorded in each word row traversed by a read current signal; and
a sequential access logic system for controlling the readout of data words from said memory matrix comprising a series of logic units, each associated with a respective word row of said memory matrix and each including
a read command signal input,
a mismatch pulse input,
a first output connected to the inductive means in the associated word row,
a second output connected to the read command signal input of the next succeeding logic unit,
means for establishing a RESPOND state in each logic unit wherein each unit generates a read current through its first output in response ot a read command signal received thereby and blocks the further propagation of said read command signal,
means responsive to mismatch pulses received by each logic unit for switching said logic unit to an IGNORE state in which said unit propagates a read command signal received by said unit to its second output,
means for switching each said logic unit from its RESPOND state to its IGNORE state after the generation of a read current through its first output, and
criteria definition means for selectively inhibiting the switching of each logic unit from the RESPOND state to the IGNORE state in response to mismatch pulses received thereby;
whereby a read command signal applied to said series of logic units is routed in sequence through each logic unit in the IGNORE state to the first logic unit in the RESPOND state and each succeeding read command is routed to successive logic units in the RESPOND state for the generation of read currents, thereby to control the readout of selected words of data from said memory matrix.

5. An associative memory system for storing and retrieving digital data according to selected criteria comprising:

a magnetic core matrix memory made up of bit columns and word rows of bit storage elements, each of which exhibits plural states of magnetic stability;
means to set said rows of bit storage elements to magnetic states representing respective words of data;
a reference register having a plurality of stages for accepting respective bits of a master word, each stage associated with a column of bit storage elements;
means for generating interrogation signals in accordance with data in the various positions of the reference register along associated columns of bit storage elements;
means including a plurality of word sense lines each traversing the bit storage elements for a particular word row responsive to said interrogation signals for generating mismatch signal on the associated word sense line for each bit storage element containing a mismatch with the related reference register stage;
a plurality of word logic units associated with respectively separate word rows, each of said units including
a read command input line,
a read command output line,
a word line input connected to the associated word sense line,
a read current output line,
means for establishing within each of said units a RESPOND state in which a read command input signal on said read command input line generates a read current signal on said read current output line, and
means responsive to mismatch signals received on said input word line for establishing within said unit an IGNORE state in which a read command input signal on said read command input line is propagated through said unit to its read command output line;
criteria-defining means for selectively inhibiting said word logic units from being placed in the aforesaid IGNORE state by mismatch signals received thereby;
means in each logic unit for switching the condition thereof from the RESPOND state to the IGNORE state after the generation thereby of a read current signal; and
means connecting the read command output line of each word logic unit to the read command input line of the next succeeding word logic unit,
whereby a series of read command signals applied to said series of word logic units is routed sequentially through each word logic unit in the IGNORE state directly to successive word logic units in the RESPOND state; and means responsive to a READ current on the read current output line of any of said logic units for reading out of said memory matrix the word of data recorded in the word row associated with the respective logic unit.

6. The associative memory system as defined in claim 5 in which indicator means are connected to the read command output line of the final logic unit of said series, said indicator means serving to indicate when all words of the memory which have met the search criteria have been read out of said memory matrix.

7. An associative memory system for storing and retrieving digital data according to preselected criteria comprising: a magnetic core matrix memory made up of bit columns and word rows of bit storage elements, each of which exhibits plural states of magnetic stability; means to set said rows of bit storage elements to magnetic states representing respective words of data;

a reference register having a plurality of stages for accepting respective data bits of a master word, each stage associated with a column of bit storage elements;
means for generating interrogation pulses in accordance with data in the various positions of the reference register along associated columns of bit storage elements;
means responsive to said interrogation pulses for generating mismatch pulses along each word row containing a mismatch with data in the various positions of the reference register;
a plurality of word logic units, each associated with one of said word rows and connected to receive the mismatch pulses therefrom;
means for generating read command signals subsequent to said interrogation and mismatch pulses and for applying said read command signals serially through said word logic units;

means for establishing within said of said word logic units a RESPOND condition in which a read command input signal generates a read current output;

means in each logic unit responsive to mismatch signals received thereby for establishing within said unit an IGNORE condition in which a read command input signal is propagated through said unit to the next succeeding logic unit;

means for establishing criteria of acceptance or rejection of said mismatch signals by selectively inhibiting the response of each logic unit to said mismatch signals according to predetermined criteria;

and means in each logic unit for establishing the aforesaid IGNORE condition therein after the generation of a read current output thereby, whereby a read command signal applied to said series of word logic units is routed in sequence through each word logic unit in the IGNORE state to the first word logic unit in the RESPOND state; and means responsive to a read current output from each word logic unit for reading out of said memory matrix the word in memory associated therewith.

8. The associative memory system as defined in claim 7 in which indicator means are connected to the read command output line of the final logic unit of said series, said indicator means serving to indicate when all words of the memory which have met the search criteria have been read out of said memory matrix.

References Cited

UNITED STATES PATENTS

| | | | |
|---|---|---|---|
| 3,093,814 | 6/1963 | Wagner et al. | 340—172.5 |
| 3,104,380 | 9/1963 | Haibt | 340—174 |
| 3,121,217 | 2/1964 | Seeber et al. | 340—174 |
| 3,184,717 | 5/1965 | Behnke | 340—173.1 |
| 3,191,155 | 6/1965 | Seeber et al. | 340—172.5 |
| 3,191,156 | 6/1965 | Roth | 340—172.5 |
| 3,235,839 | 2/1966 | Rosenberg | 340—172.5 |
| 3,241,123 | 3/1966 | Boucheron | 340—172.5 |
| 3,248,704 | 4/1966 | Roth et al. | 340—172.5 |
| 3,264,624 | 8/1966 | Weinstein | 340—172.5 |

OTHER REFERENCES

Zito, C. A.: Readout Sequencing System. In IBM Technical Disclosure Bulletin. 3(10): pp. 61–62. March 1961.

ROBERT C. BAILEY, *Primary Examiner.*

J. P. VANDENBURG, *Assistant Examiner.*